United States Patent
Franz et al.

(10) Patent No.: US 8,745,382 B2
(45) Date of Patent: Jun. 3, 2014

(54) METHOD, APPARATUS, COMPUTER PROGRAM, DATA STORAGE MEDIUM AND COMPUTER PROGRAM PRODUCT FOR PREVENTING RECEPTION OF MEDIA DATA FROM A MULTICAST SERVICE BY AN UNAUTHORIZED APPARATUS

(75) Inventors: Matthias Franz, Neubiberg (DE); Günther Horn, München (DE)

(73) Assignee: Siemens Aktiengesellschaft, Munich (DE)

( * ) Notice: Subject to any disclaimer, the term of this patent is extended or adjusted under 35 U.S.C. 154(b) by 1408 days.

(21) Appl. No.: 12/087,985

(22) PCT Filed: Jan. 15, 2007

(86) PCT No.: PCT/EP2007/050334
§ 371 (c)(1),
(2), (4) Date: Jul. 18, 2008

(87) PCT Pub. No.: WO2007/082860
PCT Pub. Date: Jul. 26, 2007

(65) Prior Publication Data
US 2009/0138719 A1     May 28, 2009

(30) Foreign Application Priority Data

Jan. 20, 2006   (DE) .......................... 10 2006 002 892

(51) Int. Cl.
*H04L 29/06*          (2006.01)
(52) U.S. Cl.
CPC ............ *H04L 63/065* (2013.01); *H04L 63/104* (2013.01)
USPC ............................ 713/163; 713/150; 713/162
(58) Field of Classification Search
CPC ............................ H04L 63/065; H04L 63/104
USPC .......................................... 713/163, 150, 162
See application file for complete search history.

(56) References Cited

U.S. PATENT DOCUMENTS

| | | | |
|---|---|---|---|
| 6,996,722 B1 | 2/2006 | Briscoe et al. | |
| 7,177,658 B2 * | 2/2007 | Willenegger et al. | ......... 455/522 |

(Continued)

FOREIGN PATENT DOCUMENTS

| | | |
|---|---|---|
| DE | 10215747 B4 | 11/2004 |
| DE | 69825479 T2 | 7/2005 |

(Continued)

OTHER PUBLICATIONS

Diot et al.; Deployment issues for the IP multicast service and architecture; Jan./Feb. 2000; Network, IEEE (vol. 14 , Issue: 1) ; pp. 78-88.*

(Continued)

*Primary Examiner* — Bradley Holder
(74) *Attorney, Agent, or Firm* — Staas & Halsey LLP

(57) ABSTRACT

The method for the transmission of media data from a multicast service by a first apparatus to a plurality of second apparatuses is suitable for preventing reception of the media data by an unauthorized second apparatus using a security process. A first apparatus is provided which can be used to provide the media data protected by a security process. A third apparatus is provided which can be used to perform the security process with the first apparatus, performance of the security process between the first apparatus and the third apparatus and, on the basis of this, interchange of at least security data between the first apparatus and the third apparatus in order to provide the media data. A second apparatus is selected which can be used to perform at least one reception process for receiving the media data. A first data transmission link is selected which can be used to couple the first apparatus and the second apparatus at least for the purpose of transmitting the media data. The provided media data is received using the second apparatus via the first data transmission link.

19 Claims, 2 Drawing Sheets

(56) References Cited

U.S. PATENT DOCUMENTS

| | | | |
|---|---|---|---|
| 7,185,362 B2 | 2/2007 | Hawkes et al. | |
| 7,583,977 B2* | 9/2009 | Willenegger et al. | 455/522 |
| 7,593,746 B2* | 9/2009 | Willenegger et al. | 455/522 |
| 7,623,483 B2* | 11/2009 | Yi et al. | 370/328 |
| 7,715,833 B2 | 5/2010 | Sanchez | |
| 2003/0207696 A1* | 11/2003 | Willenegger et al. | 455/522 |
| 2004/0081192 A1* | 4/2004 | Koulakiotis et al. | 370/432 |
| 2004/0116139 A1* | 6/2004 | Yi et al. | 455/503 |
| 2005/0008159 A1* | 1/2005 | Grilli et al. | 380/270 |
| 2005/0030966 A1* | 2/2005 | Cai et al. | 370/432 |
| 2005/0043035 A1* | 2/2005 | Diesen et al. | 455/454 |
| 2005/0070277 A1* | 3/2005 | Hu | 455/432.3 |
| 2005/0075124 A1* | 4/2005 | Willenegger et al. | 455/522 |
| 2005/0129018 A1* | 6/2005 | Casaccia et al. | 370/390 |
| 2006/0056396 A1* | 3/2006 | Chao et al. | 370/352 |
| 2006/0104225 A1* | 5/2006 | Kim et al. | 370/313 |
| 2006/0171369 A1* | 8/2006 | Ostrup et al. | 370/349 |
| 2006/0189272 A1* | 8/2006 | Willenegger et al. | 455/3.01 |
| 2006/0252439 A1* | 11/2006 | Cai | 455/515 |
| 2007/0105557 A1* | 5/2007 | Israelsson et al. | 455/436 |
| 2007/0130476 A1* | 6/2007 | Mohanty | 713/191 |
| 2007/0165551 A1* | 7/2007 | Proctor et al. | 370/312 |
| 2007/0197235 A1* | 8/2007 | Zhang | 455/466 |
| 2007/0213081 A1* | 9/2007 | Zhang | 455/466 |
| 2007/0232308 A1* | 10/2007 | Bergstrom et al. | 455/436 |
| 2008/0009274 A1* | 1/2008 | Zhu et al. | 455/414.2 |
| 2008/0022325 A1* | 1/2008 | Ober et al. | 725/81 |
| 2008/0045224 A1* | 2/2008 | Lu et al. | 455/446 |
| 2008/0070611 A1* | 3/2008 | Yi et al. | 455/515 |
| 2008/0101270 A1* | 5/2008 | Kekki et al. | 370/312 |
| 2008/0130548 A1* | 6/2008 | Kaikkonen et al. | 370/312 |
| 2008/0233974 A1* | 9/2008 | Xu | 455/458 |

FOREIGN PATENT DOCUMENTS

| | | |
|---|---|---|
| JP | 2004/112210 | 4/2004 |
| JP | 2005039607 A | 2/2005 |
| JP | 2005-535195 | 11/2005 |
| JP | 2005-537713 | 12/2005 |
| JP | 2007/527652 | 9/2007 |
| WO | WO 0044130 A1 | 7/2000 |
| WO | 2004/112314 | 12/2004 |
| WO | 2005/006643 | 1/2005 |
| WO | 2005/009001 | 1/2005 |

OTHER PUBLICATIONS

Amir et al.; An application level video gateway; ACM New York, NY, USA 1995; Proceeding Multimedia '95 Proceedings of the third ACM international conference on Multimedia, pp. 255-265.*

Japanese Office Action for corresponding Japanese Application No. 2008-550733, mailed on Mar. 9, 2011.

Japanese Office Action for related Japanese Patent Application No. 2008-550733, mailed on Jan. 13, 2012.

3GPP TS 31.111 V6.7.0 (Dec. 2005), $3^{rd}$ Generation Partnership Project; Technical Specification Group Core Network and Terminals; USIM Application Toolkit (USAT) (Release 6), Dec. 2005, 92 pages.

3GPP TS 33.102 V5.7.0 (Dec. 2005): Technical Specification; "Technical Specification Group Services and System Aspects; 3G Security; Security Architecture (Release 5)", $3^{rd}$ Generation Partnership.

RFC 2401: HTTP Authentication: Basic and Digest Access AuthenticationS. Kent et al; Network Working Group; Request for Comments: 2401; Obsoletes: 1825; Category: Standards Track; IETF / RFC; Others; 1998.

IEEE Computer Society; 802.11i IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 6: Medium Access Control (MAC) Security Enhancements; IEEE Standards, Bd. 802.11, Seiten 1-175; New York; IEEE; Others; 2004; US.

EBU Project Group: "Functional Model of a Conditional Access System", EBU Review—Technical, European Broadcasting Union, Brussels, BE, No. 266, Dec. 21, 1995, pp. 64-77; ; Others.

3GPP SA WG1: 3rd Generation Partnership Project, 3GPP Technical Specification Group Service and System Aspects; Service Requirements for Personal Network Management; Stage 1 (Release 7), 3GPP TS 22.259 V1.0.0.

3GPP SA WG1: 3rd Generation Partnership Project, 3GPP Technical Specification Group Service and System Aspects; Feasibility Study on (U)SIM Security Reuse by Peripheral Devices on Local Interfaces (Release 6), Dec. 2004, 3GPP TR 33.817 V6.1.0, 3GPP Specificaions, pp. 1-39.

OMA BCAST: "Service and Content Protection for Mobile Broadcast Services", Draft Version 1.0; OMA-TS-BCAST_SvcCntProtection-V1_0-20060103-D, OMA Standards, Jan. 3, 2006, pp. 1-89.

A. Menezes, P. van Oorschot, S. Vanstone, Handbook of applied cryptography, CRC-Press, 1996, pp. 9, 396-397.

3GPP TS 33.220—V6.4.0 (Mar. 2005); Others, Mar. 2005.

3GPP TS 33.246 "Security of Multimedia Broadcast/Multicast Service", http://www.3gpp.org/ftp/Specs/html-info/33-series.htm; Others, Dec. 2005.

3GPP TS 33.234 "Wireless Local Area Network (WLAN) Interworking Security", http://www.3gpp.org/ftp/Specs/html-info/33-series.htm, Dec. 2005.

* cited by examiner

METHOD, APPARATUS, COMPUTER PROGRAM, DATA STORAGE MEDIUM AND COMPUTER PROGRAM PRODUCT FOR PREVENTING RECEPTION OF MEDIA DATA FROM A MULTICAST SERVICE BY AN UNAUTHORIZED APPARATUS

CROSS REFERENCE TO RELATED APPLICATIONS

This application is based on and hereby claims priority to German Application No. 10 2006 002 892.9 filed on Jan. 20, 2006 and PCT Application No. PCT/EP2007/050334 filed on Jan. 15, 2007, the contents of which are hereby incorporated by reference.

BACKGROUND OF THE INVENTION

The invention relates to transmitting media data from a multicast service.

With a multicast connection or multipoint connection in a computer network, in particular the Internet or a UMTS network, outgoing media data is simultaneously transmitted by a sender, e.g. a server for multicast services, to a plurality of receivers. Such media data includes audio data, video data or streaming media for example. If the transmission is performed in a continuous data stream, and if the received data stream is processed, in particular decoded and displayed, continuously in the terminal during the transmission, this is referred to as "streaming". In many cases the data transmitted via a multicast connection is intended only for a specific group of receivers and is therefore encrypted. A new receiver that wishes to use a multicast service must first authenticate itself to the server in order to obtain additional information that enables it to decrypt the data stream. In addition, the messages or data between the receiver and server may be integrity protected. Security functions such as authentication, integrity protection or encryption and decryption may include steps that can only be executed on one particular device of a subscriber or user.

In the text below, the terms "process" or "procedure" are used synonymously with the term "function", for example the security function and the security process.

The publication DE 102 15 747 B4 relates to the protected downloading of an electronic object. It discloses the distribution of various functionalities required for protected downloading of the electronic object, e.g. software, to a plurality of devices connected by a personal area network (PAN). Said functionalities may be, for instance, control functions, security functions and transmission functions. The security task (SA) must be performed during said protected downloading, by which a security check of the electronic object (IE) is carried out. In this case the protected downloading is only completed or fully executed, that is to say the downloaded electronic object is only accepted by the receiving device, once one or more security checks have been successfully executed. The publication DE 102 15 747 B4 furthermore describes that it is sufficient for the security task or the security check of the downloaded electronic object to be performed by a function unit in the PAN, so that if the result of checking is positive, the electronic object is deemed to be secure on the level of the PAN, that is to say for all function units of the PAN. The publication DE 102 15 747 B4 is thus intended to enable the receiver to verify the security attributes of the received object by performing appropriate security checks. This method thus serves solely to protect the receiver.

The disadvantage of the method set out in the publication DE 102 15 747 B4 is that it is not suitable for restricting the reception of the electronic objects solely to authorized receivers. One typical way of verifying security attributes is verification of a digital signature. The security data required to verify the security attributes, such as a cryptographic key for example, may be public (e.g. Public Key). One typical way of preventing unauthorized reception is encryption by the sender and distribution of the encryption key solely to authorized receivers. The security data required to prevent unauthorized reception, e.g. cryptographic keys, must however be secret.

The technical specification 3GPP TS 33.234 "Wireless Local Area Network (WLAN) Interworking Security", which on the filing date of the present application was available on the 3GPP website, describes the security architecture for the interworking between a 3GPP system and WLAN access networks. This relates to the mutual authentication and the protection of a connection between user terminals and an IP network, such as the Internet or the IP network of a mobile radiocommunications network operator for example, and is restricted to WLAN access networks. Both the access of a computer to an IP network of a UMTS network operator as well as access to the Internet or only to the local WLAN network are considered here. In all cases, the user is authenticated using the smartcard (UICC or SIM) which the user obtained from the network operator through his subscription to a mobile radiocommunications network, and which is checked by the UMTS network operator when the WLAN is accessed. The protocol used for this is EAP-SIM in the case of a SIM card, or EAP-AKA in the case of a USIM application on an UICC. The method also assumes the further use of the security standard for WLANs according to IEEE 802.11i or the use of the security standard IPsec for IP networks according to IETF RFC2401. Said security methods are however not suitable for protecting multicast methods or multicast services. Moreover, independent transport of security and media data is not possible.

SUMMARY

One potential object is therefore to provide protected transmission of media data from a multicast service in a simple and particularly cost-effective way, with which in particular the sender can restrict reception to receivers authorized by the sender.

Another potential object is to provide protected transmission of media data from a multicast service by distributing the functions or processes required for the multicast service over a plurality of devices.

A further potential object is to provide protected transmission of media data from a multicast service for a specific user via any receiving devices, freely selectable by the user, which in particular need not be registered specifically for the multicast service.

One potential object is moreover to provide protected transmission of media data from a multicast service via a transmission link that is adapted to the respective multicast service and in particular to the respective terminal.

According to the method proposed by the inventors, media data is transmitted from a multicast service by a first apparatus to a plurality of second apparatuses, which method is suitable for preventing reception of the media data by an unauthorized second apparatus by a security process, wherein the method includes the following steps: provision of a first apparatus which can be used to provide the media data protected by a security process; provision of a third apparatus which is used to perform the security process between the first apparatus and the third apparatus and, on the basis of this, exchange of at least security data between the first apparatus and the third apparatus in order to provide the media data; selection of a second apparatus which can be used to perform at least one reception process for receiving the media data; selection of a first data transmission link which can be used to couple the first apparatus and the second apparatus at least for the purpose of transmitting the media data; and performance of the reception process for receiving the provided media data by the second apparatus via the first data transmission link.

One advantage is that a single subscription of the third apparatus or its user to a multicast service is sufficient to use different devices or second apparatuses respectively to receive the media data from the multicast service. A subscriber or user does not need to register again with the multicast service for each receiving device. Instead it is sufficient to couple the receiving device (second apparatus) with the third apparatus, which has stored the proof of authorization for the multicast service in the form of security data. For the user this enables a simple, cost-effective, location-independent and receiving device-specific independent connection to a multicast service. The subscriber or user is thus advantageously able to receive a subscription multipoint connection service or multicast service using different devices with a single subscription. The method expediently enables the reception of the media data at the user end on the one hand, and the realization of the required security functions or the security process in different devices or apparatuses on the other hand. A further advantage of the proposed method is that the distribution of the processes, such as the reception process and security process, to different apparatuses of the user is independent of the communication between the first apparatus and the third apparatus for performing the security process.

The user can freely choose one of the available devices or second apparatuses for receiving, and preferably also for representing, the media data. Let us assume for the sake of example that the security parameters or security data required for receiving are stored in a mobile phone (third apparatus). The user can then display the media data on a different device (second apparatus) which has a larger screen or a larger display and/or a faster link or connection to the network over which the data is received, and/or which is more suitable for decrypting the media data (using for example the security data provided by the mobile phone).

The user can freely choose between the available distribution networks, or first data transmission links respectively, such as UMTS or WLAN or DSL access for example, for receiving, and preferably also for representing, the media data. It is therefore possible to obtain the optimum transmission quality and/or the most favorable and most cost-effective tariff in each case.

According to one preferred further development, a second data transmission link is selected which can be used to couple the third apparatus and the second apparatus at least for the purpose of transmitting the security data, wherein at least part of the security data generated during the performance of the security process between the first apparatus and the third apparatus is transmitted from the third to the second apparatus.

According to another preferred further development, the data of the security process is exchanged between the first apparatus and the third apparatus via the first data transmission link coupled with the second data transmission link, wherein the second apparatus only forwards said data.

According to another preferred further development, a third data transmission link is selected which can be used to couple the first apparatus and the third apparatus at least for the purpose of transmitting the security data, wherein the security data generated during the performance of the security process is exchanged between the first apparatus and the third apparatus via the third data transmission link in order to provide the media data. One particular advantage of said further development is that the channels or data transmission links respectively for transmitting the security data and the media data are independent of one other.

According to another preferred further development, the security data and/or the media data and/or control data is transmitted via the first data transmission link and/or the second data transmission link and/or the third data transmission link. The transmission of the control data, in particular from the third apparatus to the second apparatus, expediently enables a type of remote control for the second apparatus, which performs the receiving process and in particular also the representation process for the media data. However, it is also conceivable for the control data to be transmitted in all other transmission directions in order, in particular, to transmit parameters that are required for the optimized transmission and representation of the media data, such as screen resolution and suitable transmission rates.

According to one preferred embodiment, the media data is transmitted using a streaming method in which the media data is continuously processed by the second apparatus during transmission, in particular displayed on a display of the second apparatus.

According to another preferred embodiment, the media data is transmitted by downloading an electronic object using a download method in which the media data is processed by the second apparatus, and in particular displayed on the display of the second apparatus, only once the complete electronic object has been received.

According to another preferred embodiment, the first apparatus is designed as a server, and/or the third apparatus is designed as a mobile phone and/or smartcard, and/or the second apparatus is designed as a laptop, personal computer, personal digital assistant or mobile phone, and/or the first data transmission link is designed as a WLAN, DSL or UMTS connection, and/or the second data transmission link is designed as a Bluetooth, infrared, WLAN or cable connection, and/or the third data transmission link is designed as a WLAN, DSL or UMTS connection.

According to another preferred further development, the first data transmission link and/or the second data transmission link and/or the third data transmission link are selected by a user, in particular by a user of the third apparatus, or by the third apparatus or by the second apparatus. The subscriber or user can therefore freely choose between the available distribution networks, or data transmission links respectively, such as UMTS, WLAN or DSL for example. It is therefore expediently possible to obtain the optimum transmission quality and/or the most favorable tariff in each case.

According to another preferred further development, the first data transmission link and/or the second data transmission link and/or the third data transmission link are designed as secure connections.

According to another preferred embodiment, the third apparatus provides at least one first parameter and/or the second apparatus provides at least one second parameter for selecting the first data transmission link and/or the second data transmission link and/or the third data transmission link. The optimum data transmission link for the respective multicast service can be selected by the first parameter and/or the second parameter, which are designed as optimized transmission rate or optimized screen resolution for example.

According to another preferred embodiment, the security process includes a registration process and/or an authentication process and/or an integrity process and/or an encoding process which includes in particular encryption and decryption of the media data.

According to another preferred embodiment, the security data includes registration data and/or cryptographic data, in particular keys and/or digital signatures, and/or synchronization data.

According to another preferred further development, part of the security data required for the authorized reception of the media data is identical at least for a predetermined group of the plurality of the second apparatuses.

According to a further preferred embodiment, the method is employed in, or in connection with, an MBMS security architecture. With respect to the MBMS security architecture, reference is made to the technical specification 3GPP TS 33.246 "Security of Multimedia Broadcast/Multicast Service", which on the filing date of the present application was available on the 3GPP website.

According to another preferred embodiment, the second apparatus and the third apparatus are part of a single personal area network (PAN) in each case.

According to another preferred further development, a representation process for the visual and/or acoustic representation of the received media data is performed.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
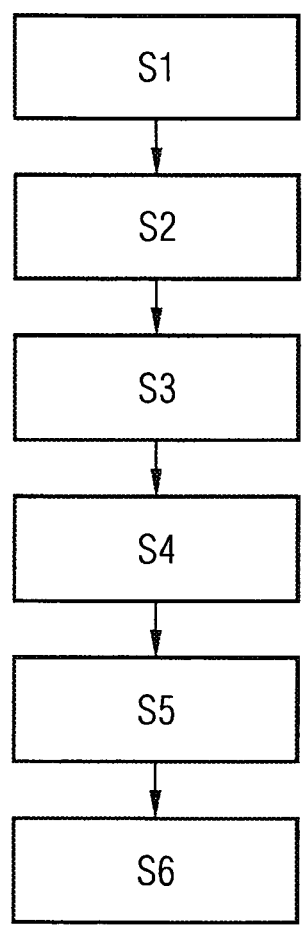
FIG. 1: shows a schematic flow diagram of an exemplary embodiment of the method according to one potential embodiment of the invention.

Reference will now be made in detail to the preferred embodiments of the present invention, examples of which are illustrated in the accompanying drawings, wherein like reference numerals refer to like elements throughout.

FIG. 1 shows a schematic flow diagram of a preferred exemplary embodiment of the proposed method for the transmission of media data MD from a multicast service by a first apparatus S to a plurality of second apparatuses D. The method is suitable for preventing reception of the media data MD by an unauthorized second apparatus D by a security process.

The method will be explained below with reference to the block diagram in FIG. 1. The proposed method may have the following steps S1-S6:

Step S1:
A first apparatus S which can be used to provide the media data MD protected by a security process is provided. The first apparatus S is preferably designed as a server in a network, in particular the Internet.

Step S2:
A third apparatus M which is used to perform the security process with the first apparatus S is provided. The third apparatus M is preferably designed as a mobile phone and/or smartcard. The security process includes in particular a registration process and/or an authentication process and/or an integrity process and/or an encoding process with encryption and decryption of the media data.

Step S3:
The security process is performed between the first apparatus S and the third apparatus M. On the basis of this, at least security data SD is exchanged between the first apparatus S and the third apparatus M in order to provide the media data MD. The security data SD preferably includes registration data and/or cryptographic data, in particular keys and/or digital signatures, and/or synchronization data. In particular, the security data SD required for the authorized reception of the media data MD may be identical at least for a predetermined group of the plurality of the second apparatuses D.

Step S4: A second apparatus D which can be used to perform a reception process for receiving the media data MD is selected. The second apparatus D is preferably designed as a laptop, personal computer (PC), personal digital assistant (PDA) or mobile phone. The second apparatus D and the third apparatus M are preferably part of a single personal area network (PAN) in each case.

Step S5: A first data transmission link 1 which can be used to couple the first apparatus S and the second apparatus D at least for the purpose of transmitting the media data MD is selected. The first data transmission link 1 is preferably designed as a WLAN, DSL or UMTS connection.

Step S6: The reception process for receiving the provided media data MD is performed by the second apparatus D via the first data transmission link 1. The media data MD is preferably transmitted using a streaming method. With the streaming method, the media data MD is continuously processed by the second apparatus D during transmission. For instance, the second apparatus D represents the media data MD on an integrated display during the continuous processing. In this example, therefore, a representation process for the visual and/or acoustic representation of the received media data MD is performed. As an alternative to the streaming method, the media data MD may be transmitted by downloading an electronic object using a download method in which the media data MD is processed by the second apparatus D, and in particular displayed on the display of the second apparatus D, only once the complete electronic object has been received.

The method can preferably be employed in, or in connection with, an MBMS security architecture.

Figure 2:
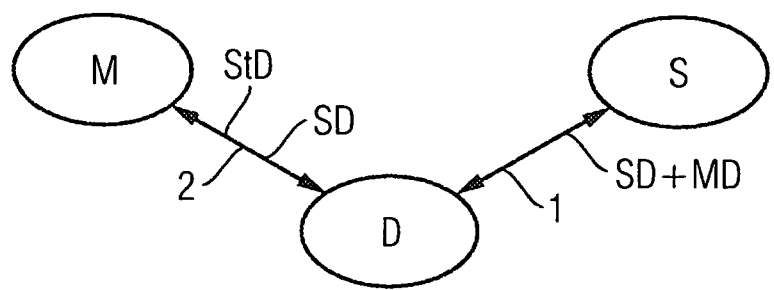
FIG. 2: shows a schematic block diagram of a first exemplary embodiment of the coupling of the first, second and third apparatus.
Figure 3:
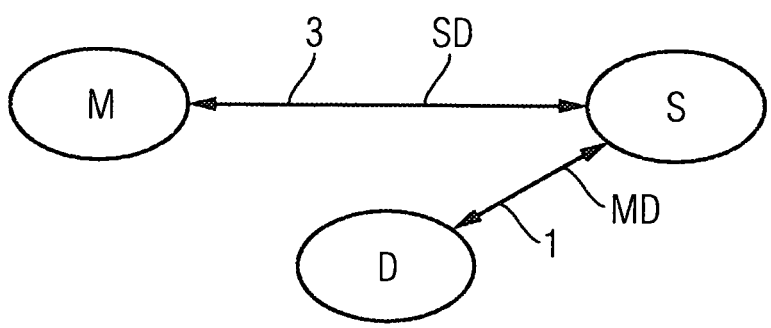
FIG. 3: shows a schematic block diagram of a second exemplary embodiment of the coupling of the first, second and third apparatus.

The method as shown in FIG. 1 may be employed for example in an arrangement according to FIG. 2 or also in an arrangement according to FIG. 3.

According to FIG. 2, a second data transmission link 2 is selected which can be used to couple the third apparatus M and the second apparatus D at least for the purpose of transmitting the security data SD. When performing the security process, the generated security data SD is exchanged between the first apparatus S and the third apparatus M via the first data transmission link 1 and via the second data transmission link 2 in order to provide the media data MD. It is also possible to transmit control data StD via the second data transmission link 2, by which the third apparatus M acts as a type of remote control for the second apparatus D. However, it is also possible to transmit control data StD from the second apparatus D to the third apparatus M by the second data transmission link 2, in order for example to initiate signing of data to be transmitted to the first apparatus 1. The second data transmission link 2 is designed as a Bluetooth connection for example.

According to FIG. 3, it is also possible to select a third data transmission link 3 which can be used to directly couple the first apparatus S and the third apparatus M at least for the purpose of transmitting the security data SD. The security data SD generated during the performance of the security process is then exchanged between the first apparatus S and the third apparatus M directly via the third data transmission link 3 in order to provide the media data MD. The third data transmission link 3 is designed as a WLAN, DSL or UMTS connection for example. The channel D-S is then expediently independent of the channel M-S.

Two exemplary embodiments will illustrate the mode of operation below with reference to FIGS. 1 to 3. For the sake of brevity, the first apparatus S, the second apparatus D and the third apparatus M will be referred to by their reference symbols S, D and M.

For the exemplary embodiments it is assumed that M and S share a secret which is part of the security data SD and which is linked to the identities of M and S. This secret results in particular from the subscription of M to S. M and S thus have a security relationship. In a 3GPP network, this secret can be established by a "generic bootstrapping architecture" for example. On the filing date of the present application the technical specification 3GPP TS 33.220 "Generic Bootstrapping Architecture" was available on the 3GPP website. Both examples below are characterized by the fact that M transmits only as little security-relevant data to D as is absolutely necessary for D to be able to decrypt the multicast data stream. As a result, only the keys at the lowest end of the key hierarchy (see MBMS security architecture for example) will be transmitted from M to D. This also means for example that all messages or data sent to S can only be signed or provided with integrity protection by M. As a consequence, D must first present all messages to be sent to S to D for signing.

In alternative embodiments, however, it is also possible for other keys that are higher in the key hierarchy to be transmitted from M to D. In such a case, D could then also sign messages to S. Such an alternative embodiment increases effectiveness, since fewer messages need be sent between M and D, but it does presume a higher degree of trust between M and D.

The embodiment may be selected in each case depending on the trust relationship between M and D. The two exemplary embodiments described below assume a minimum of trust between M and D.

In these examples, the authentication of M to S is based on a challenge-response method. With respect to the challenge-response method, reference is made to A. J. Menezes, P. C. van Oorschot, S. A. Vanstone, "Handbook of Applied Cryptography", CRC Press, Boca Raton 1997. Following the first message to S, usually a registration message, S sends a challenge back. The corresponding response is calculated by M on the basis of the secret shared with S and is sent back to S. In the examples below, from this time on S will send back a new challenge with every response, on the basis of which M calculates and sends a response with a new message to S. This consequently saves some messages in comparison with the method (which is also possible) in which M responds to every message first of all with a challenge.

It is also possible for S to be authenticated by M. This authentication may also be realized by a challenge-response method or by the use of sequence numbers, as described in 3GPP TS 33.102 "Security architecture".

EXAMPLE 1

M with Security and Control Function

M is able to send commands or messages to the displaying device D. As a result, it can perform the role of a remote control for D. D forwards the control messages or commands from M to the server S and vice versa. In addition D checks these messages and thus obtains knowledge of when S is transmitting data streams. D does not then forward the latter to S, but displays them. In addition, D can send messages to M in order to find out the key required for decryption.

Registration:
The user selects at M a transmission x, for example in reaction to a short message received.
1. M ->D: Registration message for transmission x M sends the request to D to register itself with the server for the transmission x.
2. D ->S: Forward registration message for the transmission x D forwards the message received from M on to S.
3. S ->D: Authentication request S replies to the registration message with a request to the receiving device to authenticate itself. This request contains a challenge.
4. D ->M: Forward authentication request Since only M has the keys required for authentication, D forwards the authentication request to M.
5. M ->D: Authentication response M calculates the response corresponding to the challenge and sends it back to D.
6. D ->S: Forward authentication response D forwards the message to S.
7. S ->D: OK S checks whether the response is correct and if so replies with OK.
8. D ->M: Forward OK D forwards the OK to M.

Deregistration:
By an input at M the user gives the signal to terminate reception:
1. M ->D: Deregistration message for transmission x (including authentication) M wishes to terminate reception of the transmission x and creates a message to this effect.
2. D ->S: Forward deregistration message for the transmission x D transmits the message to the server S.
3. S->D: OK
S checks the signature and confirms deregistration.
4. D ->M: Forward OK D forwards the OK to M.

Distribution of a Key Encrypted using a Secret Shared by S and M:
1. S ->D: Key Enc(y) (encrypted with the secret shared by S and M) The server S transmits the key y to each multicast subscriber separately. So that only registered subscribers can use the key, it is encrypted using the secret known only to S and to the respective multicast subscriber M in each case.
2. D ->M: Forward key Enc(y) Since D does not know this secret, it forwards the message to M.
3. M ->D: OK M checks whether it has the key required for decrypting the key y. If so, the key y is decrypted. Otherwise the key required for decryption is first requested. The response is OK in both cases.

Distribution of a Key Shared by Several/all Subscribers:
1. S ->D: Key z (encrypted using another key y shared by several/all) The server S transmits a new key z to all multicast subscribers. So that only registered subscribers can use the key z, it is encrypted using another key y which is known to several/all authorized subscribers.

2. D ->M: Forward key D does not know the key required for decryption and forwards the message to M.
3. M->OK M checks whether it has the key y required for decrypting the key z. If so, the new key z is decrypted. Otherwise the key y required for decryption is first requested. The response is OK in all cases.

Key Request:

1. M ->D: Request key y (where y is encrypted with another key) M requires the key y and sends a corresponding key request to D.
2. D ->S: Forward the request for key y D forwards the request to S.
3. S->D: OK S confirms reception of the request and will then send the key y.
4. D ->M: Forward OK D forwards the response to M.

Reception of Multicast Data:

1. S ->D: Multicast data, encrypted with a key z S sends the encrypted data stream to all subscribers using the multicast method.
2. D ->M: Request key z: The multicast data is decrypted by D. D requests the key z required for this from M. If M does not have the key z, M initiates a key request and waits for the resulting response.
3. M ->D: Key z M transmits the requested key z to D.

EXAMPLE 2

M with Security Function Only

In example 2 all dialogs between D and M proceed from D at the user end. Communication between D and M is therefore analogous to that between a mobile phone and its built-in smartcard. Otherwise example 2 corresponds to example 1. In particular M can only create messages to S, since D cannot sign these.

Registration:

At D the user selects a transmission x for reception, for instance from an electronic program guide displayed on the screen.

1. D ->M: Request registration message for the transmission x D requires a registration message which D cannot create itself.
2. M ->D: Registration message for transmission x M replies with the desired message
3. D ->S: Forward registration message for the transmission x D sends the message to S.
4. S ->D: Authentication request S replies to the registration message with a request to the receiving device to authenticate itself. This request contains a challenge.
5. D ->M: Forward authentication request and request Authentication response
6. M ->D: Authentication response M calculates the response corresponding to the challenge and sends it back to D.
7. D ->S: Forward authentication response D forwards the message to S.
8. S ->D: OK D forwards the OK to M.

Deregistration:

By an input at D the user gives a signal to terminate reception:

1. D ->M: Request deregistration message for the transmission x D requires a deregistration message which D cannot create itself.
2. M ->D: Deregistration message for transmission x (including authentication) M replies with the desired (signed) message
3. D ->S: Forward deregistration message for the transmission x D transmits the message to the server S.
4. S->D: OK S checks the signature and confirms deregistration.

Distribution of a Key Encrypted using a Secret Shared by S and M:

1. S ->D: Key Enc(y) (encrypted with the secret shared by S and M) The server S transmits the key y to each multicast subscriber separately. So that only registered subscribers can use the key y separately, it is encrypted using the secret known only to S and to the respective multicast subscriber M in each case.
2. D ->M: Forward key M checks whether it has the key required for decrypting the key y. If so, y is decrypted and
3. M ->D: OK is the response. Otherwise M demands the request of the key required for decryption
3. M ->D: Error message together with request message for key y (including authentication)
4. D ->S: Forward the request message for the key y D forwards the key request to S.
5. S->D: OK S confirms reception and will then send the key y.

Distribution of a Key Shared by Several/all Subscribers: as in the First Example Reception of Multicast Data:

1. S ->D: Multicast data, encrypted with a key z S sends the encrypted data stream to all subscribers using the multicast method.
2. D ->M: Request key z The multicast data is decrypted by D. D requests the key required for this from M.
3. M ->D: Key z M transmits the requested key z to D. If M does not have the requested key z, instead of with the last step, communication is continued as follows:
3. M ->D: Error message together with request message for key y (including authentication) M signals that the key y is required and sends a corresponding request to D.
4. D ->S: Forward request message key y D forwards the request to S.
5. S->D: OK S confirms reception and will then send the key y to D encrypted in the manner described above. Once D has received the key and has forwarded it to M as described above, D repeats step 2.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for the transmission of media data as a multicast service to a plurality of second apparatuses, comprising:
   providing a first apparatus which multicasts the media data protected by a security process to the plurality of second apparatuses;
   providing a third apparatus to initiate messages and exchange security data with the first apparatus for a security process preventing an unauthorized second apparatus from receiving the media data;
   selectively determining, by a third apparatus, a chosen second apparatus from a plurality of second apparatuses to receive the media data where the third apparatus acts as a remote control for the chosen second apparatus;

selecting a first data transmission link to connect the first apparatus and the chosen second apparatus to transmit the media data;

receiving the media data at the chosen second apparatus via the first data transmission link; and selecting a second data transmission link to connect the third apparatus and the chosen second apparatus and at least part of the security data is transmitted from the third apparatus to the chosen second apparatus via the second data transmission link, wherein a third data transmission link connects the first apparatus and the third apparatus and the security data is exchanged between the first apparatus and the third apparatus using the third data transmission link, and wherein control data is transmitted via at least one of the first data transmission link, the second data transmission link, and the third data transmission link.

2. The method as claimed in claim 1, wherein
a further data transmission link connects the first apparatus and the third apparatus, and
the security data is exchanged between the first apparatus and the third apparatus via the further data transmission link.

3. The method as claimed in claim 1, wherein the media data is streamed to the chosen second apparatus so that the media data is continuously processed by the chosen second apparatus during transmission.

4. The method as claimed in claim 3, wherein the media data is displayed at the chosen second apparatus during transmission.

5. The method as claimed in claim 1, wherein the media data is downloaded as an electronic object by the chosen second apparatus, and
the media data is displayed at the chosen second apparatus only after the electronic object has been completely received.

6. The method as claimed in claim 1, wherein
the first apparatus is a server, and/or the third apparatus is a mobile phone or smartcard, and/or the chosen second apparatus is a laptop, personal computer, personal digital assistant or mobile phone, and/or the first data transmission link is a WLAN, DSL or UMTS connection, and/or the second data transmission link is a Bluetooth, infrared, WLAN or cable connection, and/or the third data transmission link is a WLAN, DSL or UMTS connection.

7. The method as claimed in claim 1, wherein
the third apparatus provides a first parameter and/or the chosen second apparatus provides a second parameter to select at least one of the first data transmission link, the second data transmission link, and the third data transmission link.

8. The method as claimed in claim 1,
wherein the security process includes at least one of a registration process, an authentication process, an integrity process, and an encoding process.

9. The method as claimed in claim 1,
wherein the security data includes at least one of registration data, cryptographic data, and synchronization data.

10. The method as claimed in claim 1,
wherein the security data includes registration data, synchronization data, and a cryptographic key or digital signature.

11. The method as claimed in claim 1, wherein
receipt of at least a part of the security data is required for authorized reception of the media data, and
a same part of the security data is transmitted to each second apparatus for authorized reception.

12. The method as claimed in claim 1, wherein the method is part of an multimedia broadcast/multicast service (MBMS) security architecture.

13. The method as claimed in claim 1, wherein the chosen second apparatus and the third apparatus are part of a single local area network.

14. The method as claimed in claim 1, further comprising playing the media data with a visual and/or acoustic media data player.

15. The method as claimed in claim 1, wherein the third apparatus sends messages to the chosen second apparatus.

16. The method as claimed in claim 1, wherein the third apparatus encodes the media data with an encryption and/or decryption process.

17. The method as claimed in claim 1, wherein,
the first data transmission link, the second data transmission link and the third data transmission link are independent of one another.

18. A system to transmit media data as a multicast service, comprising:
a first hardware apparatus which multicasts the media data protected by a security process to a plurality of second apparatuses;
a third apparatus to initiate messages and exchange security data with the first hardware apparatus for a security process preventing unauthorized second apparatuses from receiving the media data; and
a first data transmission link which couples the first hardware apparatus and the plurality of second apparatuses, the first data transmission link being used to transmit the media data from the first hardware apparatus to a chosen second apparatus, the chosen second apparatus selectively determined from the plurality of second apparatuses by the third apparatus, where the third apparatus acts as a remote control for the chosen second apparatus,
a second data transmission link which connects the third apparatus and the chosen second apparatus and at least part of the security data is transmitted from the third apparatus to the chosen second apparatus via the second data transmission link; and
a third data transmission link which connects the first apparatus and the third apparatus and the security data is exchanged between the first apparatus and the third apparatus using the third data transmission link,
wherein the media data is received at the chosen second apparatus via the first data transmission link and control data is transmitted via at least one of the first data transmission link, the second data transmission link, and the third data transmission link.

19. A non-transitory computer readable storage medium storing a program which when executed on a computer causes the computer to execute a method for the transmission of media data as a multicast service to a plurality of second apparatuses, the method comprising:
providing a first apparatus which multicasts the media data protected by a security process to the plurality of second apparatuses;
providing a third apparatus configured to select a transmission enabling the third apparatus to initiate messages and exchange security data with the first apparatus for a security process preventing an unauthorized second apparatus from receiving the media data;

selectively determining, by the third apparatus, a chosen second apparatus from the plurality of second apparatuses which receives the media data where the third apparatus acts as a remote control for the chosen second apparatus;

selecting a first data transmission link which couples the first apparatus and the chosen second apparatus to transmit the media data;

receiving the media data at the chosen second apparatus via the first data transmission link;

selecting a second data transmission link to connect the third apparatus and the chosen second apparatus and at least part of the security data is transmitted from the third apparatus to the chosen second apparatus via the second data transmission link; and connecting, via a third data transmission link, the first apparatus and the third apparatus, and the security data is exchanged between the first apparatus and the third apparatus using the third data transmission link, and wherein control data is transmitted via at least one of the first data transmission link, the second data transmission link, and the third data transmission link.

* * * * *